United States Patent [19]

Martinez Corral

[11] 4,362,230

[45] Dec. 7, 1982

[54] MOTOR VEHICLE CLUTCH MECHANISM

[75] Inventor: Cecilio Martinez Corral, Murcia, Spain

[73] Assignee: Fraymon S.A.E., Madrid, Spain

[21] Appl. No.: 178,010

[22] Filed: Aug. 14, 1980

[30] Foreign Application Priority Data

Aug. 17, 1979 [FR] France ............................. 79 20837

[51] Int. Cl.³ ...................... F16D 13/70; F16D 13/69
[52] U.S. Cl. ............................. 192/109 R; 192/70.28
[58] Field of Search ............... 192/70.28, 109 R, 89.B, 192/99 S, 99 A, 70.27

[56] References Cited

U.S. PATENT DOCUMENTS

| | | | |
|---|---|---|---|
| 1,926,922 | 9/1933 | Stanley | 192/68 |
| 2,541,611 | 2/1951 | Reed | 192/99 |
| 4,086,995 | 5/1978 | Spokas | 192/89 B |

FOREIGN PATENT DOCUMENTS

| | | |
|---|---|---|
| 1580169 | 9/1969 | France . |
| 2300933 | 9/1976 | France . |
| 2339099 | 8/1977 | France . |

*Primary Examiner*—George H. Krizmanich
*Attorney, Agent, or Firm*—Charles E. Brown

[57] ABSTRACT

This invention relates to a clutch mechanism, having a cover which includes an annular lateral wall and a pressure plate adapted to engage at least one transverse bearing shoulder formed integrally with the cover. The bearing shoulder is intended to axially retain the pressure plate relative to the cover against the action of the clutch spring, e.g. during storage. The retaining shoulder is formed directly on the cover, for example on the peripheral radial rim thereof, by means of a recess formed in the lateral wall. This enables a bayonet-type mounting of the pressure plate within the cover.

13 Claims, 19 Drawing Figures

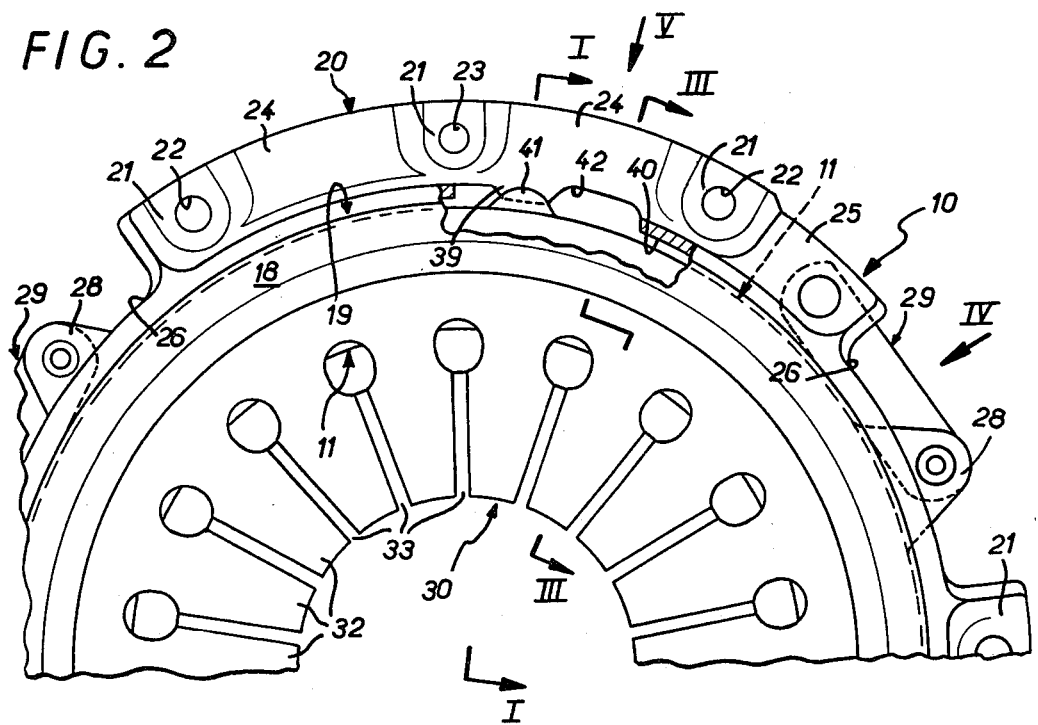
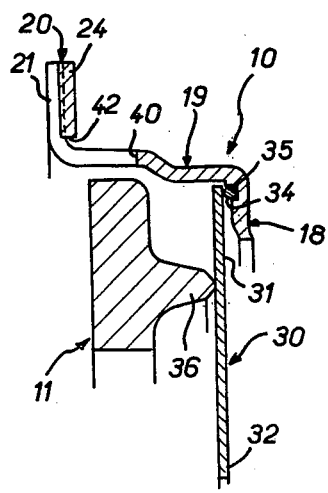
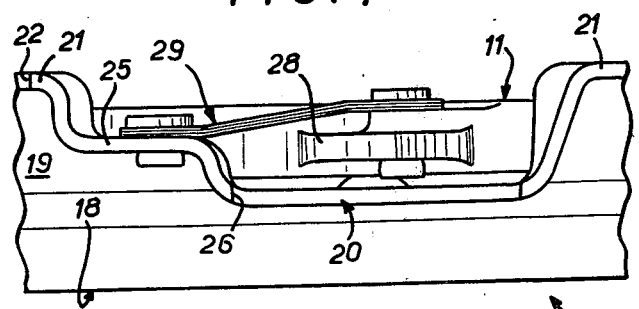
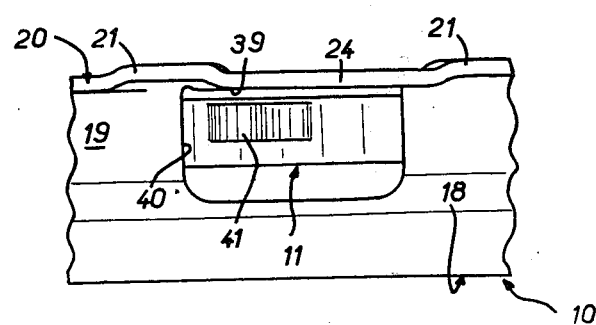

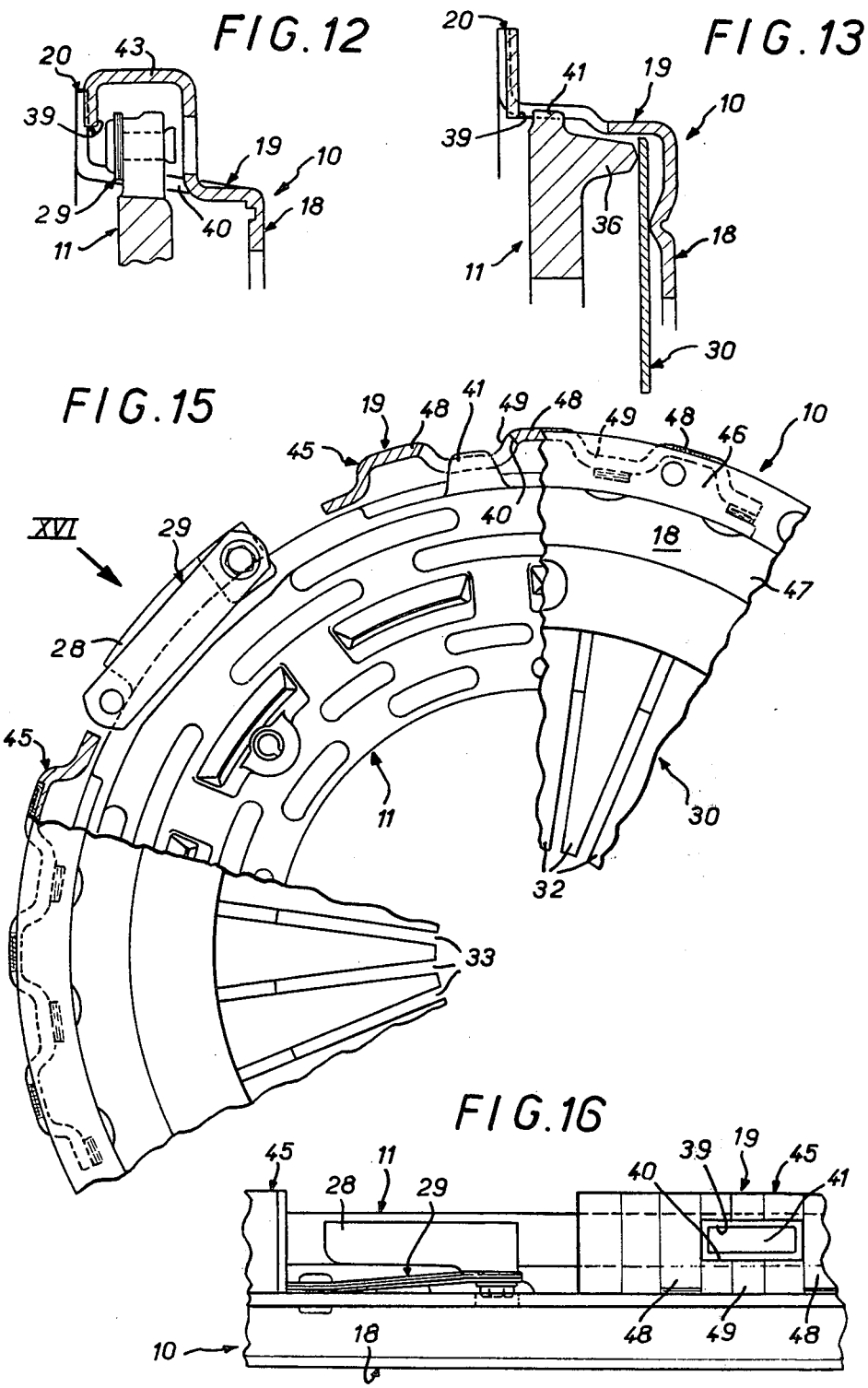

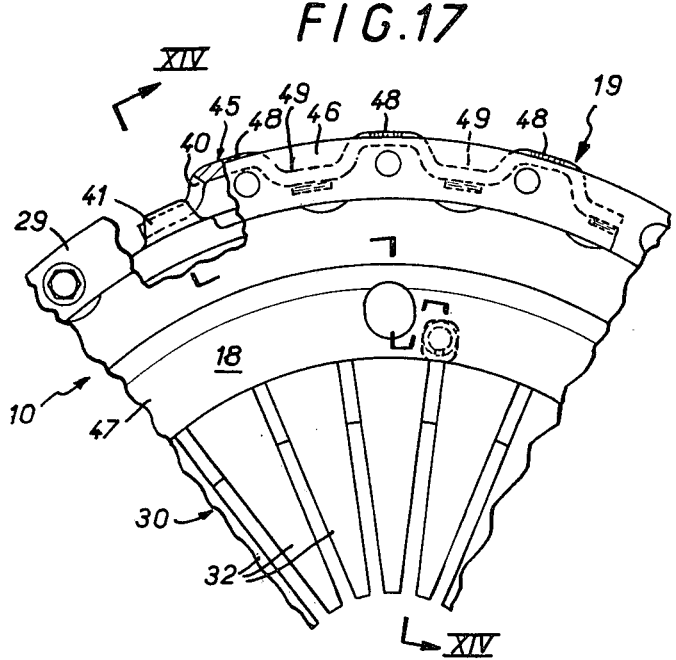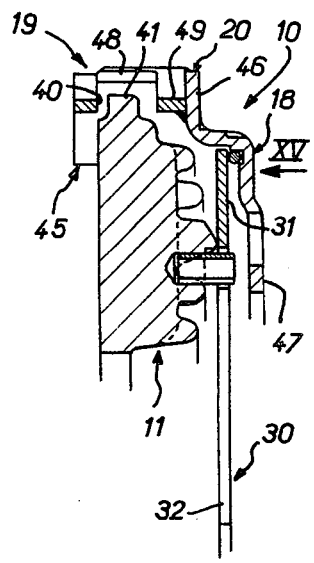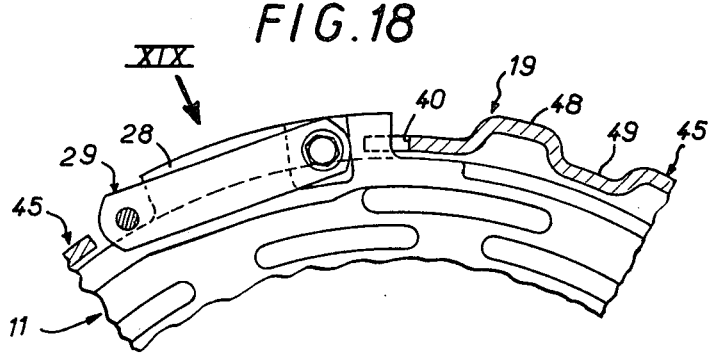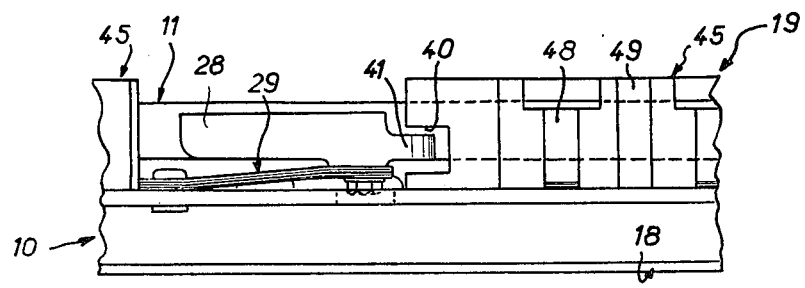

MOTOR VEHICLE CLUTCH MECHANISM

BACKGROUND OF THE INVENTION

The present invention relates generally to clutches, and in particular to clutches for motor vehicles; more specifically, the invention concerns that part of these clutches which is commonly referred to as the clutch mechanism or cover assembly, which, forming a unitary assembly, is connected to the reaction plate after the insertion of a friction disc.

In general terms, a clutch mechanism of this kind comprises a first substantially annular part generally referred to as the cover, a second substantially annular part generally referred to as the pressure plate, which is connected for rotation with the cover by coupling means which allow the pressure plate to be axially displaced relative to the cover, and between the cover and the pressure plate, axially acting elastic means which bear on the cover and which urge the pressure plate in a direction away from the said cover.

For example, in a mechanism for a diaphragm clutch, the axially acting elastic means consist of the periphery of a third annular part comprising a diaphragm spring, the central part of which is divided up into radial fingers for controlling the release of the periphery, and means for mounting the diaphragm for rocking movement on the cover, the said diaphragm bearing on the pressure plate by its said peripheral part.

The present invention concerns the case where the clutch mechanism in question is intended to be connected to a flat reaction plate, that is to say a reaction plate devoid of any axially-extending lateral wall at its periphery, or a slightly hollow reaction plate, that is to say a reaction plate provided, at this periphery, with a lateral wall of reduced axial extension, which at most extends over the friction disc.

In such a case, it is the cover which possesses a lateral wall extending parallel to its axis, in order to define this space. In certain embodiments, this lateral wall is integral with the transverse wall, or base, on which the axially acting elastic means bear.

In other embodiments, the lateral wall of the cover is divided up into wall elements, forming a raised part, these elements being joined to the transverse wall of the cover, parallel to its axis, as described, for example, in French Pat. No. 2,300,933, and also in the addition to this U.S. Pat. No. 2,339,099.

In general terms, in clutch mechanisms, it is desirable to limit the axial distance through which a pressure plate is capable of travelling due to the pressure of the axially acting elastic means.

This applies in particular, during the storage of a clutch mechanism of this kind, before it is mounted on a reaction plate, because if the pressure plate, which at this stage is not axially buttressed by the reaction plate, does not have a limited axial movement, damage can result to the coupling means connecting it to the cover, particularly in the case of simple strips which only offer a moderate axial resistance.

It is for this reason that provision is usually made to associate, with the pressure plate, abutment means which are suitable for axially retaining the pressure plate after a predetermined axial distance of travel relative to the cover.

Most frequently, these abutment means comprise a transverse bearing shoulder which is integral with the pressure plate and which is located on the other side of the cover relative to this pressure plate, for cooperation with this cover, this bearing shoulder in practice being formed at the end of an axially projecting pin with which the pressure plate is equipped for this purpose.

However, a reverse arrangement has already been proposed, in particular in French Pat. No. 1,580,169, which relates to a mechanism intended to be joined to a reaction plate of the hollow kind, in which the transverse bearing shoulder employed is formed on a particular part which is separate from the cover and which is joined to the latter when the mechanism is assembled; this inevitably complicates the assembly step.

The present invention relates in general terms to a clutch mechanism which is more particularly, but not essentially intended to be fitted to a flat reaction plate and which is equipped with a bearing shoulder for the pressure plate integral with the cover.

SUMMARY

The invention provides a clutch mechanism in particular for a motor vehicle, of the kind comprising a first substantially annular part or cover, which comprises a transverse wall substantially perpendicular to its axis, and a lateral wall optionally divided up into wall elements joined to the transverse wall, parallel to the said axis, a second substantially annular part, or pressure plate, which is connected in rotation to the cover by coupling means permitting an axial displacement of the pressure plate relative to the cover, and, between the cover and the pressure plate, axially acting elastic means which bear on the cover and act axially on the pressure plate to urge the pressure plate away from the cover, together with abutment means which are suitable for axially retaining the pressure plate after a predetermined axial travel of the latter relative to the cover, the said retaining means comprising at least one transverse bearing shoulder which is integral with the cover and which is located on the other side of the pressure plate relative to the transverse wall of the cover, the said bearing shoulder being formed directly on the cover by means of a recess in the lateral wall thereof.

Thus, according to the invention, the lateral wall of the cover is advantageously used to form a transverse bearing shoulder which is suitable for axially retaining the pressure plate.

Consequently, no additional part needs to be joined to the cover after the latter has been produced, and, in particular, no additional part needs to be added when the mechanism of which it forms part is assembled.

BRIEF DESCRIPTION OF THE DRAWINGS

FIG. 2 is a partial view in elevation of this mechanism, looking in the direction of the arrow II of FIG. 1, with a local cut-away section;

FIG. 3 is another view in partial axial section of this mechanism, taken along the broken line III—III of FIG. 2;

FIGS. 4 and 5 are partial side views of this mechanism, respectively looking in the directions of the arrows IV and V of FIG. 2;

FIGS. 10, 11 and 12 are similar views to that of FIG. 3, each showing respectively a modified embodiment;

FIG. 13 is a similar view to that of FIG. 3 and shows another type of clutch mechanism to which the invention is applied;

FIG. 14 is a similar view to that of FIG. 3, showing another modified embodiment;

FIG. 15 is a partial view in elevation of this modified embodiment, looking in the direction of the arrow XV of FIG. 14, with a cut-away section;

FIG. 16 is a partial side view of this embodiment looking in the direction of the arrow XVI of FIG. 15;

FIG. 17 is a similar view to that of FIG. 15 and shows a modified embodiment;

FIG. 18 is a similar view to that of FIG. 15 and shows another modified embodiment; and FIG. 19 is a partial side view of this latter modified embodiment, looking in the direction of the arrow XIX of FIG. 18.

DETAILED DESCRIPTION OF THE PREFERRED EMBODIMENTS

In general terms, and as illustrated in these Figures, a clutch mechanism comprises a first substantially annular part 10, referred to as the cover, a second substantially annular part 11, referred to as the pressure plate, and, interposed between these parts, axially acting elastic means, described in detail below, which bear on the cover 10 and act axially on the pressure plate 11 to urge the pressure plate in a direction away from the cover.

Figure 1:
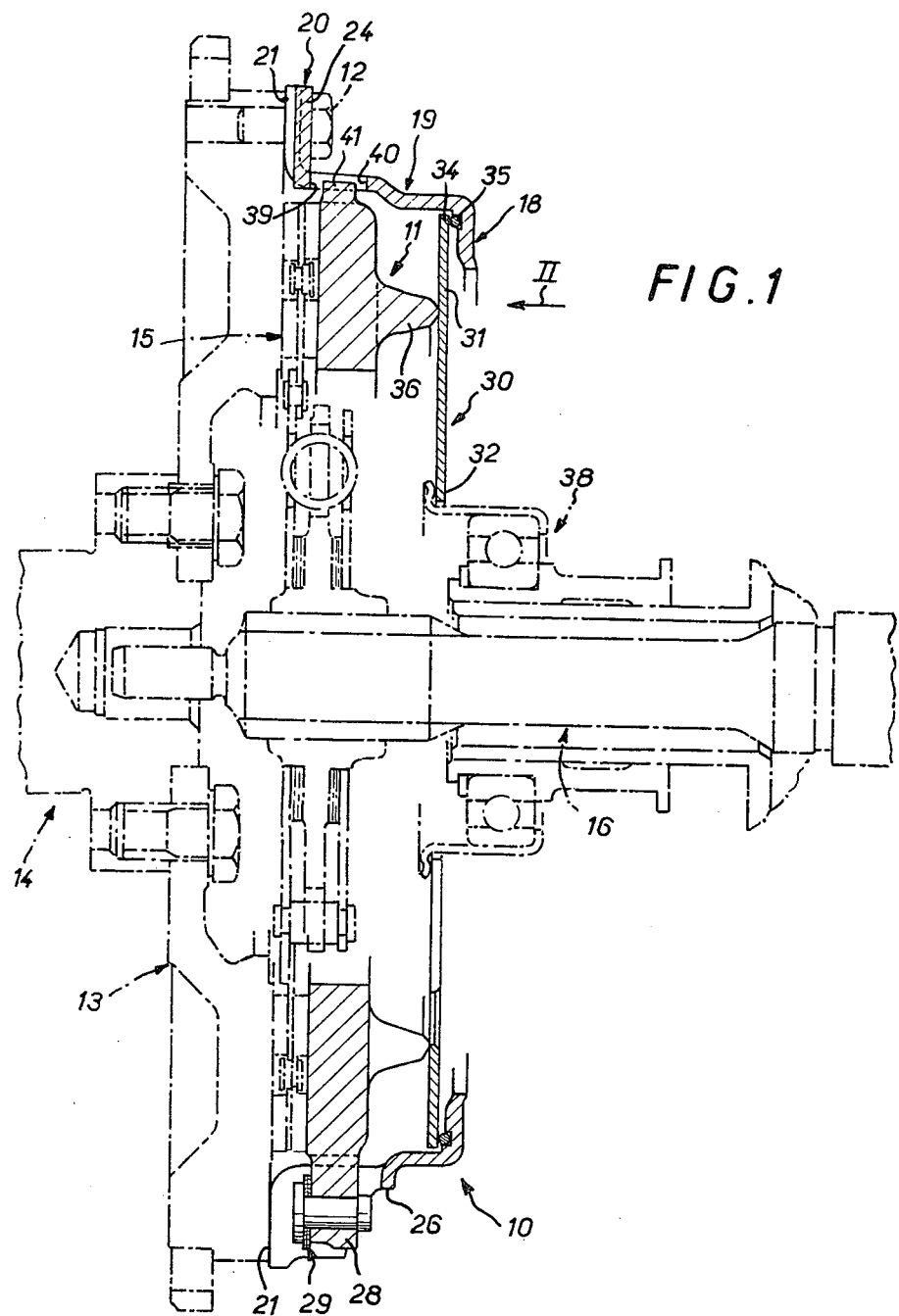
FIG. 1 is a view in axial section of a clutch mechanism according to the invention, taken along the line I—I of FIG. 2, this mechanism being shown in position on a reaction plate.
Figure 6:
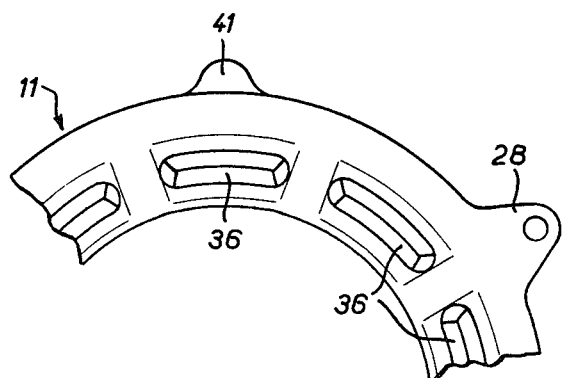
FIG. 6 is a partial view in elevation of only the pressure plate used in this clutch mechanism.
Figure 7:
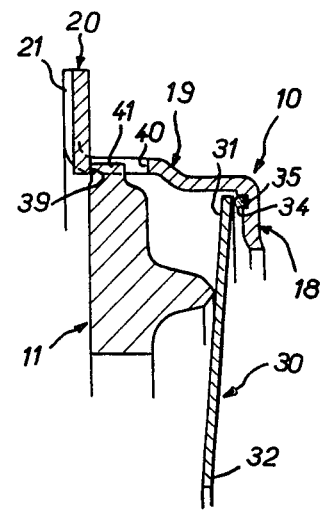
FIG. 7 repeats part of FIG. 1, the mechanism being shown in isolation, for example during storage.

As shown schematically in broken lines in FIG. 1, this clutch mechanism is intended to be connected by means of screws 12 to a reaction plate or flywheel 13, which is integral in rotation with a first shaft 14, which in practice is a driving shaft, with the interposition of a friction disc 15 integral in rotation with a second, driven, shaft 16.

As will be noted, the reaction plate 13 is of the flat type, that is to say it is devoid of any cylindrical lateral wall, and the clutch mechanism which is connected to it by means of the screws 12 is fixed transversely at a level which is approximately the same as that at which the friction disc 15 is applied to it by means of the pressure plate 11.

Thus, the cover 10 of this mechanism, which comprises a transverse wall 18 extending substantially perpendicular to its axis for supporting the associated axially acting elastic means, also comprises a lateral wall 19 extending substantially parallel to its axis, in order to define, together with the reaction plate 13, the space necessary for housing the axially acting elastic means, the pressure plate 11 and the friction disc 15.

In the embodiments illustrated in FIGS. 1 to 13, at that end of its lateral wall 19 which is opposite to its transverse wall 18, the cover 10 is formed at its periphery with an outwardly-projecting radial rim 20. This radial rim 20 is provided with regions which are perpendicular to the axis of the unit and which are located at various levels.

Those regions 21, which are furthest from the transverse wall 18 are each formed either with a hole 22, suitable for receiving the screws 12 used for fixing the cover 10 to the reaction plate 13, or with a centering hole 23, suitable for receiving a centering pin (FIG. 2).

Between the regions 21, regions 24, which are slightly set back relative to the regions 21, define, together with the reaction plate 13, passages which are suitable for ventilating the space between the reaction plate and the cover 10, and for expelling the dust which can be generated in this enclosure.

Regions 25, which are set back substantially more than the regions 24, relative to the regions 21, are used for fixing the pressure plate 11 to the cover 10, as described in detail below.

There are three of these regions 25 in the example shown; at the edge of one of the circumferential sides of each of these regions 25, the radial rim 20 of the cover 10 is provided with a wide notch 26.

To enable it to be fixed to the cover 10, the pressure plate 11 possesses radially projecting lugs 28, of which there are three in the example shown in FIGS. 1, 2, 4 and 6.

Each radial lug 28 extends opposite a notch 26 and is coupled to the corresponding region 25 of the cover 10 by means of a set of strips 29 which are arranged approximately tangentially to a circumference of the unit and which are connected by means of rivets to the respective lug and the respective region 25.

Thus, as can easily be understood, the coupling means consisting of these strips 29 permit the axial displacement of the pressure plate 11 relative to the cover 10, whilst at the same time connecting this pressure plate for rotation therewith.

In the example shown, the axially acting elastic means consists of a third substantially annular part 30 in the form of a diaphragm, which comprises a peripheral part 31, forming a cup spring, and a central part divided up into radial fingers 32 by means of slots 33.

By means of its peripheral part 31, the diaphragm 30 bears on the cover 10, via a supporting ring 34 housed in a groove 35 in the cover 10, and bears on the pressure plate 11 via an axially-extending boss 36 provided for this purpose.

By means of its radial fingers 32, the diaphragm 30 is subjected, during declutching, to the action of a clutch release bearing 38, which is shown in broken lines in FIG. 1.

In the example shown in FIGS. 1 to 12, which relates to a clutch mechanism intended for forming a so-called traction-controlled clutch, with the clutch release bearing 38 acting under traction on the surface of radial fingers 32 facing the reaction plate 13, the diameter of the circumference over which the peripheral part 31 of the diaphragm 30 bears on the cover 10 is greater than the diameter of the circumference over which the peripheral part 31 bears on the pressure plate 11.

In the clutch mechanism according to the invention, abutment means are provided for axially retaining the pressure plate 11 after a predetermined axial travel of the latter relative to the cover 10, the said abutment means comprising at least one transverse bearing shoulder 39 which is integral with the cover 10 and which is located on the other side of the pressure plate 11 relative to the transverse wall 18. According to the invention, this bearing shoulder 39 is formed directly on the cover 10 by means of a recess 40 in the lateral wall 19.

In the embodiment illustrated in FIGS. 1 to 6, three bearing shoulders 39 are provided and are uniformly distributed in a circle, each of these bearing shoulders 39 being formed directly on the radial rim 20 of the cover 10, and more precisely on a region 24 of this rim, the corresponding recess 40 in the lateral wall 19 of the cover 10 extending axially up to this radial rim 20; for cooperation with each bearing shoulder 39, the pressure plate 11 is provided with a peripherally projecting retaining element in the form of an ear 41 forming a part of this pressure plate 11 which is separate from each of the radial lugs 28.

In practice, in the embodiment shown in FIGS. 1 to 6, in association with each bearing shoulder 39 the radial rim 20 possesses a notch 42 which is circumferentially offset relative to this bearing shoulder 39 but directly adjacent, and which is a continuation of the corresponding recess 40 in the lateral wall 19 of the cover 10, the said notch 42 having a sufficient radial and circumferential development for the axial passage of a retaining ear 41.

Thus, the positioning of the pressure plate 11 in the cover 10, before it is fixed to the latter by means of the strips 29, can be carried out in accordance with mounting of the "bayonet" type, that is to say mounting which firstly involves axial enagagment of the pressure plate 11 in the cover 10, this pressure plate 11 being presented so that its retaining ears 41 are opposite the notches 42 in the radial rim 20 and then, after passing the said ears through this radial rim by means of these notches, rotation of the pressure plate 11 in the cover 10, about the axis of the unit, until, as shown, the retaining ears 41 are facing the corresponding bearing shoulders 39, this rotation being permitted by the recesses 40 in the lateral wall 19.

During storage, that is to say when the radial fingers 32 of the diaphragm 30 are not subjected, under traction, to a clutch release bearing, and when this diaphragm 30 therefore acts freely on the pressure plate 11, the latter, which is thus not held by a friction disc, is advantageously axially retained by its retaining ears 41 bearing against the corresponding transverse bearing shoulders 39 on the cover 10 (FIG. 7), the axial retaining of the pressure plate thus avoiding any damage which could be suffered by the tangential strips 29 and/or the pressure plate 11 itself.

Figure 8:
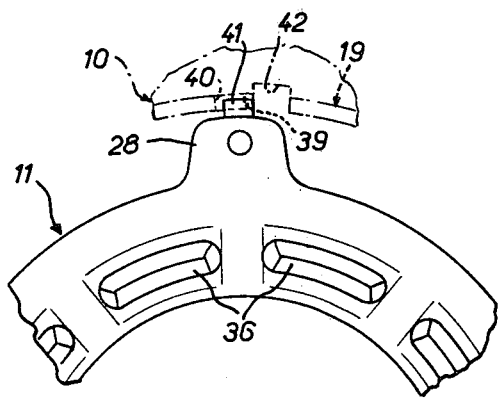
FIG. 8 is a similar view to that of FIG. 6 and shows a modified embodiment of the pressure plate.
Figure 9:
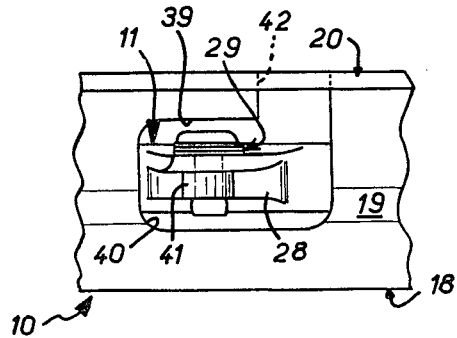
FIG. 9 is a partial side view of the mechanism fitted with this pressure plate.

According to the modified embodiment illustrated by FIGS. 8 and 9, on the one hand each retaining ear 41 of the pressure plate 11 forms a radial extension of the radial lugs 28, and on the other hand each transverse bearing shoulder 39 is formed directly by the edge of the corresponding recess 40 in the lateral wall 19 of the cover 10, at an axial distance from the radial rim 20.

However, as previously, the recess 40 is a continuation of a notch 42 in the radial rim 20 for the bayonet-type mounting of the pressure plate 11.

Figure 10:
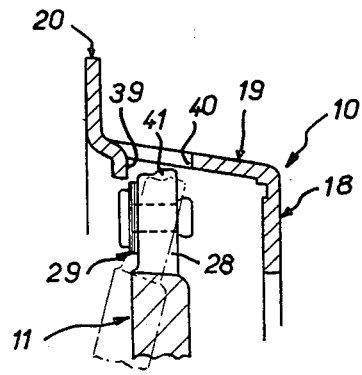

According to the modified embodiment illustrated in FIG. 10, on the one hand each retaining ear 41 on the pressure plate 11 is formed directly by a radial lug 28, and on the other hand each transverse bearing shoulder 39 is formed by a strip which, projecting inwards, radially borders the edge of the corresponding recess 40 in the lateral wall 19 of the cover 10, at an axial distance from the radial rim 20. It will be noted that the wall 19 is substantially parallel to the axis.

Moreover, as shown schematically in broken lines in FIG. 10, the positioning of the pressure plate 11 in the cover 10 can be carried out in the following manner: the pressure plate 11 is presented obliquely, and, in this oblique position, it is displaced, by translational movement in its plane by a sufficient amount for it to be straightened, one of its radial lugs 28 penetrating into the corresponding recess 40 in the cover 10; it is then displaced again by translational movement in its plane, but in the direction opposite to the previous direction, until its other radial lugs 28 each penetrate respectively into the corresponding recess 40 in the cover 10.

However, it is self-evident that, as a modification, bayonet-type mounting can also be adopted for this embodiment if desired.

Figure 11:
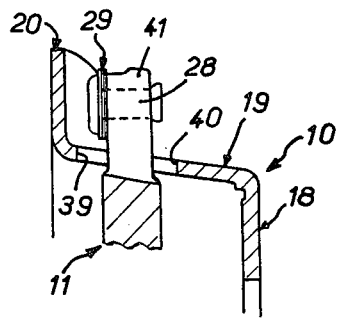

In another embodiment, illustrated in FIG. 11, in operation the radial lugs 28 on the pressure plate 11 project radially beyond the cover 10 through the recesses 40 in the lateral wall, the strips 29 being provided on the outside of the cover 10.

According to the embodiment illustrated in FIG. 12, each bearing shoulder 39 is formed by the radially inwardly-turned end of a lug 43 resulting from the cutting-out, from the lateral wall 19 of the cover 10, of the corresponding recess 40 in this lateral wall 19, the said inturned end being located at an axial distance from the radial rim 20 of the cover 10.

In the foregoing text, as indicated above the clutches described are of the traction-controlled type.

However, as indicated schematically in FIG. 13, the invention can also be applied to thrust-controlled clutches.

In this case, in the clutch mechanism in question, the diameter of the circumference over which the diaphragm 30 bears on the cover 10 is less than the diameter of the circumference over which this diaphragm 30 bears on the pressure plate 11. One or other of the arrangements described above for the bearing shoulders 39 of the cover 10 and the retaining ears 41 of the pressure plate 11 can be adopted as required in this mechanism.

In the foregoing text, the lateral wall 19 of the cover 10 is circularly contained and is integral with the transverse wall 18, the unit being produced from one and the same blank by a suitable shaping operation.

In a modified embodiment, shown in FIGS. 14 to 19, this lateral wall 19 is divided up circularly into wall elements 45 which are circumferentially separated, in pairs, by free spaces, and which are each individually joined to the transverse wall 18 to which the cover 10 is reduced, parallel to the axis of the latter, or more precisely, to a flange 46 of this transverse wall 18 which is axially offset relative to the remainder 47.

In accordance with the arrangements described in French Pat. No. 75/04432 mentioned above, these wall elements 45 constitute raised parts joined, as required, to a cover 10 which is furthermore suitable for fitting to a hollow reaction plate.

In the examples shown, each wall element 45 consists of a shaped metal strip possessing, parallel to the axis of the unit, undulations 48 projecting outwards alternating with undulations 49 projecting inwards.

According to the embodiment illustrated in FIGS. 14 to 16, the pressure plate 11 is formed with peripherally projecting retaining ears 41, and as in the embodiments illustrated in FIGS. 1 to 6, each of these ears has a contour which permits its axial engagement directly by means of an outward projecting undulation 48 of a wall element 45, and the corresponding recess 40 affects an inward projecting undulation 49 of this wall element, whilst at the same time engaging on at least one of the adjacent outward projecting undulations 48.

Thus, bayonet-type mounting of the pressure plate 11 is possible.

In this embodiment illustrated in FIGS. 14 to 16, each recess 40, of which the edge furthest from the cover 10 forms the transverse bearing shoulder 39 associated with the corresponding retaining ear 41, is spaced from both the circumferential ends of the wall element 45, and therefore has a closed contour.

In a modified embodiment, shown in FIG. 17, this recess 40 is provided at one of the circumferential ends of the wall element 45, and extends freely into the space separating the latter from the adjacent wall element 45.

In this case, the axial engagement of the retaining ears 41 of the pressure plate 11, which is necessary for the bayonet mounting of the latter, can be carried out by means of the free spaces separating the wall elements 45.

In the foregoing text, the retaining ears 41 of the pressure plate 11 form parts of the latter which are separate from the said radial lug 28.

However, as a variant, the arrangement illustrated in FIG. 17 can be utilised, modified as shown in FIGS. 18 and 19. In this embodiment, the retaining ears 41 are formed by means of a simple circumferential extension of the radial lugs 28, the free space between two wall elements 45 being sufficient for axial engagement of the unit consisting of a radial lug 28 and the retaining ear 41 extending from it, before the rotation of the pressure plate 11, which is necessary to enable this retaining ear 41 to enter the corresponding recess 40.

The present invention is not limited to the embodiments which have been described and shown, but encompasses any modified arrangement or combination of the various elements within the scope of the appended claims.

In particular, the nature of the axially acting elastic means is unimportant. These can, for example, comprise helical springs. It will also be noted that, instead of being flat, as shown, the reaction plate could be slightly hollow and could at most only extend over the surface of the friction disc 15.

I claim:

1. A clutch mechanism for a motor vehicle, comprising a cover having a transverse wall extending perpendicular to its axis, and lateral wall means joined to the transverse wall and extending substantially parallel to the said axis, a pressure plate connected for rotation with the cover by coupling means enabling axial displacement of said pressure plate relative to said cover, and, disposed between the cover and the pressure plate, axially acting elastic means bearing on the cover and acting axially on the pressure plate to urge said pressure plate away from said cover, and abutment means operable to axially retain the pressure plate after a predetermined axial travel thereof relative to the cover, said abutment means comprising at least one transverse bearing shoulder integral with the cover and located on the other side of the pressure plate relative to the transverse wall of said cover, said bearing shoulder being formed directly on the cover and comprising a recess in the lateral wall thereof.

2. A clutch mechanism as claimed in claim 1, wherein the pressure plate is provided with a peripherally projecting retaining element for cooperation with a bearing shoulder on the cover.

3. A clutch mechanism according to claim 2, wherein coupling means by which the pressure plate is connected to the cover are fixed to said pressure plate by means of radially projecting lugs extending from said pressure plate at the periphery thereof, and said retaining element forms a part of said pressure plate which is separate from each of said radial lugs.

4. A clutch mechanism according to claim 2, wherein the coupling means by which the pressure plate is connected to the cover are fixed to said pressure plate by means of radially projecting lugs extending from said pressure plate at the periphery thereof, and said retaining element forms a radial or circumferential extension of one of said radial lugs.

5. A clutch mechanism according to claim 2, wherein the coupling means by which the pressure plate is connected to the cover are fixed to said pressure plate by means of radially projecting lugs extending from said pressure plate at the periphery thereof, and said retaining element is formed directly by one of said radial lugs.

6. A clutch mechanism according to claim 1, wherein at that end of said lateral wall means which is opposite said transverse wall, the cover is provided with a radial rim on which said bearing shoulder is formed, and the corresponding recess in the lateral wall of the cover extends axially up to this rim.

7. A clutch mechanism according to claim 1, wherein at that end of said lateral wall means which is opposite said transverse wall, said cover is provided with a radial rim, and said bearing shoulder is formed directly by the edge of the corresponding recess in the lateral wall of the cover at an axial distance from said rim.

8. A clutch mechanism according to claim 1, wherein at that end of said lateral wall means which is opposite said transverse wall, said cover is provided with a radial rim, and said bearing shoulder is formed by a strip which radially borders the edge of the corresponding recess in the lateral wall of the cover, at an axial distance from said rim.

9. A clutch mechanism according to claim 1, wherein at that end of said lateral wall means which is opposite said transverse wall, said cover is provided with a radial rim, and said bearing shoulder is formed by the radially-inwardly turned end of a lug resulting from the cutting-out, from the lateral wall of the cover, of the corresponding recess therein at an axial distance from the said rim.

10. A clutch mechanism according to claim 2, wherein at that end of said lateral wall means which is opposite said transverse wall, the cover is provided with a radial rim, and said rim is formed with a notch which is circumferentially offset relative to said bearing shoulder, and which is a continuation of the corresponding recess formed in the lateral wall of said cover, the said notch having a sufficient radial development for the axial passage of a retaining element of the pressure plate.

11. A clutch mechanism according to claim 1, wherein the lateral wall means comprises a plurality of circumferentially spaced wall elements forming a raised part, and said wall elements are joined to the transverse wall of the cover and are separated by free spaces, wherein the recess corresponding to a bearing shoulder is formed at one circumferential end of one said wall element and emerges freely in the space separating said wall element from the adjacent wall element.

12. A clutch mechanism according to claim 1, wherein the lateral wall means comprises a plurality of wall elements, forming a raised part, and said wall elements being joined to the transverse wall of the cover and are formed alternatively with inwardly projecting and outwardly projecting undulations, and said recess corresponding to a bearing shoulder affects an inward projecting undulation of the wall element in question, whilst at the same time engaging on at least one of the adjacent outward projecting undulations, and the pressure plate comprises a projecting retaining element shaped for its axial engagement by means of this outward projecting undulation.

13. A clutch mechanism according to claim 1 wherein there is a flywheel, said cover being secured to said flywheel for rotation with said flywheel, and a clutch plate clamped against said flywheel by said pressure plate.

* * * * *